United States Patent
Takesue et al.

(10) Patent No.: US 6,797,786 B2
(45) Date of Patent: Sep. 28, 2004

(54) GOLF BALL MATERIALS AND GOLF BALL

(75) Inventors: Rinya Takesue, Chichibu (JP); Yasush Ichikawa, Chichibu (JP)

(73) Assignee: Bridgestone Sports Co., Ltd., Tokyo (JP)

(*) Notice: Subject to any disclaimer, the term of this patent is extended or adjusted under 35 U.S.C. 154(b) by 0 days.

(21) Appl. No.: 10/436,992

(22) Filed: May 14, 2003

(65) Prior Publication Data

US 2003/0207996 A1 Nov. 6, 2003

Related U.S. Application Data

(62) Division of application No. 09/742,092, filed on Dec. 22, 2000, now Pat. No. 6,613,843.

(30) Foreign Application Priority Data

Dec. 24, 1999 (JP) ............................................ 11-366921

(51) Int. Cl.$^7$ ............................................. A63B 37/12
(52) U.S. Cl. .................... 525/330.2; 525/196; 525/201; 525/221; 473/373; 473/378; 473/385
(58) Field of Search ................................ 525/196, 201, 525/221, 330.2; 473/373, 378, 385

(56) References Cited

U.S. PATENT DOCUMENTS

| | | |
|---|---|---|
| 3,404,134 A | 10/1968 | Rees |
| 3,959,539 A | 5/1976 | Waggoner |
| 4,010,222 A | 3/1977 | Shih |
| 4,526,375 A | 7/1985 | Nakade |
| 4,690,981 A | 9/1987 | Statz |
| 4,984,804 A | 1/1991 | Yamada et al. |
| 4,999,404 A | 3/1991 | Matsuki |
| 5,019,320 A | 5/1991 | Hasegawa et al. |
| 5,312,857 A | 5/1994 | Sullivan |
| 5,439,227 A | 8/1995 | Egashira et al. |
| 5,559,188 A | 9/1996 | Egashira et al. |
| 5,605,968 A | 2/1997 | Egashira et al. |
| 5,688,869 A | 11/1997 | Sullivan |
| 5,779,561 A | 7/1998 | Sullivan et al. |
| 5,803,831 A | 9/1998 | Sullivan et al. |
| 5,824,740 A | 10/1998 | Yabuki et al. |
| 5,902,855 A | 5/1999 | Sullivan |
| 5,929,189 A | 7/1999 | Ichikawa et al. |
| 5,948,859 A | 9/1999 | Sano et al. |
| 5,994,470 A | 11/1999 | Tanaka et al. |
| 6,018,003 A | 1/2000 | Sullivan |
| 6,034,182 A | 3/2000 | Kashiwagi et al. |
| 6,100,321 A | 8/2000 | Chen |
| 6,130,296 A | 10/2000 | Yabuki et al. |
| 6,319,153 B1 | 11/2001 | Nesbitt et al. |
| 6,325,731 B1 | 12/2001 | Kennedy, III et al. |
| 6,329,458 B1 | 12/2001 | Takesue et al. |
| 6,613,843 B2 * | 9/2003 | Takesue et al. ............. 525/221 |

FOREIGN PATENT DOCUMENTS

| | | |
|---|---|---|
| GB | 1113409 | 5/1968 |
| GB | 1 491 433 | 11/1977 |
| JP | 5-3931 | 1/1993 |
| JP | 9-117532 | 5/1997 |
| JP | 9-313643 | 12/1997 |
| JP | 10-15115 | 1/1998 |
| JP | 10-305114 | 11/1998 |
| WO | WO98/46671 | 10/1998 |
| WO | WO00/23519 A1 | 4/2000 |
| WO | WO01/29129 A1 | 4/2001 |

* cited by examiner

*Primary Examiner*—David J. Buttner
(74) *Attorney, Agent, or Firm*—Sughrue Mion, PLLC

(57) ABSTRACT

A golf ball material containing (a) a calcium ion-neutralized olefin-unsaturated carboxylic acid-unsaturated carboxylate random copolymer having an acid content of 2–12% by weight, and (b) a calcium ion-neutralized olefin-unsaturated carboxylic acid random copolymer having an acid content of 8–15% by weight, in a weight ratio from 100:0 to 40:60, and having a Shore D hardness of 30–60 is effectively moldable and is capable of providing golf balls with excellent rebound energy and a pleasant feel when hit.

11 Claims, No Drawings

GOLF BALL MATERIALS AND GOLF BALL

This is a division of application Ser. No. 09/742,092 filed Dec. 22, 2000, now U.S. Pat. No. 6,613,843; the disclosure of which is incorporated herein by reference.

This invention relates to golf ball materials which are effectively moldable and capable of providing golf balls with outstanding rebound and feel when hit. It also relates to golf balls made with such golf ball materials.

BACKGROUND OF THE INVENTION

Over the past few years, wide use has been made of ionomer resins in golf ball cover materials, also referred to hereinafter as "cover stock." Ionomer resins are ionic copolymers composed of an olefin such as ethylene in combination with an unsaturated carboxylic acid such as acrylic acid, methacrylic acid or maleic acid, wherein the acidic groups are partially neutralized with metal ions such as sodium, lithium, zinc or magnesium ions. They have excellent characteristics such as durability, rebound and scuff resistance, making them highly suitable as the base resin in golf ball cover stock.

Ionomer resins account for most of the cover stock resin in current use and enable the production of golf balls having the above properties. However, golfers are always on the lookout for golf balls having a high rebound and excellent flight characteristics.

Research works have been made on the use of ionomer resins in the cover stock for improving the rebound energy of golf balls. Many research works utilize the synergistic effect of blending two or more ionomer resins to provide better characteristics than a single ionomer resin. Prior art proposals include blending of ionomers neutralized with different metal species and blending of a hard binary ionomer with a soft ternary ionomer.

For example, U.S. Pat. No. 5,120,791 discloses a cover formed of a mixture of a sodium or zinc-neutralized binary ionomer and a sodium or zinc-neutralized ternary ionomer. This cover material, however, is less resilient than a cover material based on a magnesium-neutralized ternary ionomer which was recently marketed. Therefore, this material now finds only use as a low resilience cover material.

U.S. Pat. No. 5,688,869 discloses a cover composition comprising a binary ionomer having an acid content of at least 16% and neutralized with various metal ions and a ternary ionomer containing an acrylate as a comonomer and neutralized with various metal ions. The use of this cover composition provides a golf ball with somewhat improved flight performance over prior art cover compositions.

However, since the cover composition of the above formulation uses a high acid content ionomer having a very high rigidity, the resulting ball exhibits a hard feel when hit and discourages low-handicap golfers who make much of feel and controllability. While a number of cover compositions based on combinations of ionomer resins with various neutralizing metal ions are exemplified, any of these combinations merely achieves a resilience approximate to that of prior art cover compositions. An optimum combination of metal species has not been discovered.

In JP-A 10-15115, a cover material comprising a ternary magnesium ionomer is disclosed as exhibiting both a good feel and resilience. Although this cover material is more resilient than a prior art cover material comprising a blend of sodium and zinc ionomers, it has low productivity in that the magnesium ionomer is so hygroscopic that the percentage of molding defectives is very high due to moisture absorption as compared with prior art sodium and zinc ionomers.

As noted above, a number of methods have been proposed which utilize the synergistic improvements in physical properties by the blend of ionomers with different metal species or the blend of binary and ternary ionomers. However, a method of utilizing an ionomer resin neutralized with a single metal species or utilizing only a ternary ionomer has not been under consideration although such a method is essentially advantageous from step and cost aspects and easy to produce due to good compatibility. Regrettably, the use of a commercially available ionomer resin alone results in a substantial decline of resilience.

WO 98/46671 discloses a resin composition in which a large amount of metallic soap is added to an ionomer resin to improve the rebound characteristics of the ionomer cover stock. Specifically, a large amount of calcium stearate is added to an ionomer resin to formulate a cover composition which exhibits better rebound than earlier ionomer cover golf balls.

However, because a large amount of metallic soap is added to the ionomer resin in this prior-art cover stock, the fatty acids that form due to decomposition of the metallic soap vaporize during injection molding, generating a large amount of gas. The formation of a large amount of gas during injection molding causes molding defects. In addition, gas constituents settle on the surface of the molded article and greatly lower the paintability of the molded article. Moreover, although such cover stock in which a large amount of metallic soap is added to the ionomer resin does exhibit a rebound which is about the same as or better than that of ionomer having the same degree of hardness, the improvement in rebound is not all that large. Indeed, depending on the type of metallic soap used, the moldability and rebound may in fact be severely compromised and fall far short of practical levels.

SUMMARY OF THE INVENTION

Therefore, one object of the invention is to provide a golf ball material which is effectively moldable and capable of providing a golf ball of outstanding rebound and feel. Another object of the invention is to provide a golf ball made using the golf ball material.

In search of a golf ball material which is highly productive and resilient and capable of forming a golf ball with improved rebound and a soft feel, the inventors have found that a golf ball material comprising a soft calcium-neutralized ionomer is significantly improved in physical properties as compared with ionomers neutralized with other metal ions and that a blend thereof with a hard calcium-neutralized ionomer, that is, the use of soft and hard ionomers neutralized with the same metal species provides markedly high resilience or rebound characteristics as compared with the known ionomer blends. The present invention is predicated on this finding.

According to the invention, there is provided a golf ball material comprising (a) a ternary calcium ionomer in the form of a calcium ion-neutralized product of an olefin-unsaturated carboxylic acid-unsaturated carboxylate random copolymer having an acid content of 2 to 12% by weight, and (b) a binary calcium ionomer in the form of a calcium ion-neutralized product of an olefin-unsaturated carboxylic acid random copolymer having an acid content of 8 to 15% by weight, in a weight ratio from 100:0 to 40:60, component (a) or the mixture of components (a) and (b) having a Shore D hardness of 30 to 60.

Preferably, component (a) or the mixture of components (a) and (b) has a melt index of 0.5 to 15 dg/min. Preferably, the ternary calcium ionomer (a) has a degree of neutralization of 10 to 90 mol % and the binary calcium ionomer (b) has a degree of neutralization of 10 to 90 mol %.

In a second aspect, the invention provides a golf ball comprising a core and a cover, the cover being made of the golf ball material defined above. The invention also provides a multi-piece golf ball comprising a core and a cover of at least two layers, at least one layer of the cover being made of the golf ball material defined above.

DESCRIPTION OF THE PREFERRED EMBODIMENT

The golf ball of the invention uses as a golf ball material (a) a ternary calcium ionomer in the form of a calcium ion-neutralized product of an olefin-unsaturated carboxylic acid-unsaturated carboxylate random copolymer having an acid content of 2 to 12% by weight, or a mixture consisting of component (a) and (b) a binary calcium ionomer in the form of a calcium ion-neutralized product of an olefin-unsaturated carboxylic acid random copolymer having an acid content of 8 to 15% by weight.

The olefin used as a monomer in the ternary calcium ionomer (a) and the binary calcium ionomer (b) is preferably an unsaturated hydrocarbon of 2 to 8 carbon atoms, for example, ethylene, propylene, butene, hexene, heptene and octene. Ethylene is especially preferred. Suitable examples of the unsaturated carboxylic acid include acrylic acid, methacrylic acid, maleic acid and fumaric acid. Of these, acrylic acid and methacrylic acid are especially preferred.

The unsaturated carboxylate used as a comonomer in the ternary calcium ionomer (a) is preferably an ester of an unsaturated carboxylic acid having about 4 to 12 carbon atoms. Illustrative examples include methyl (meth)acrylate, ethyl (meth)acrylate, isobutyl (meth)acrylate, n-butyl (meth) acrylate, and 2-ethylhexyl (meth)acrylate. Especially preferred are n-butyl acrylate and isobutyl acrylate.

The content of unsaturated carboxylic acid (or acid content) within the ternary calcium ionomer (a) is 2 to 12% by weight, preferably 4 to 10% by weight, and most preferably 6 to 8% by weight. An acid content of less than 2% by weight may lead to a low rigidity and poor resilience, whereas an acid content of more than 12% by weight may lead to a too high rigidity, adversely affecting the feel.

The content of unsaturated carboxylic acid (or acid content) within the binary calcium ionomer (b) is 8 to 15% by weight, preferably 10 to 15% by weight, and most preferably 12 to 15% by weight. An acid content of less than 8% by weight may lead to a low rigidity and poor resilience, whereas an acid content of more than 15% by weight may lead to a too high rigidity, adversely affecting the feel.

The content of unsaturated carboxylate (or ester content) within the ternary calcium ionomer (a) is preferably 5 to 45% by weight, more preferably 8 to 30% by weight, and most preferably 10 to 20% by weight. An ester content of less than 5% by weight may fail to produce a fully soft cover, whereas an ester content of more than 45% by weight may adversely affect fretting resistance.

In both the ternary calcium ionomer (a) and binary calcium ionomer (a), some of the acid groups are neutralized with calcium ions. The degree of neutralization is preferably 10 to 90 mol %, more preferably 10 to 70 mol %, and most preferably 10 to 60 mol %. A degree of neutralization of less than 10 mol % may lead to insufficient resilience whereas a degree of neutralization of more than 90 mol % may interfere with the flow during molding.

Since the ternary calcium ionomer (a) and binary calcium ionomer (a) used herein are not commercially available, they are prepared by neutralizing commercially available olefin-unsaturated carboxylic acid(-unsaturated carboxylate) copolymers with metal salts containing calcium. The metal salts used for neutralization are preferably inorganic metal salts which do not produce organic compounds as by-products after neutralization, for example, calcium carbonate, calcium oxide and calcium hydroxide, more preferably calcium hydroxide.

The commercially available olefin-unsaturated carboxylic acid-unsaturated carboxylate copolymers used as the base polymer of the calcium ionomers are, for example, Nucrel AN4318, Nucrel AN4311, Nucrel AN4307, Nucrel AN4212C and Nucrel AN035C from Dupont-Mitsui Polychemical K.K. The commercially available olefin-unsaturated carboxylic acid copolymers are, for example, Nucrel 1560, Nucrel 1214, Nucrel N1050H and Nucrel N1035 from Dupont-Mitsui Polychemical K.K.

It is not critical how to prepare a calcium ionomer from an olefin-unsaturated carboxylic acid(-unsaturated carboxylate) copolymer and a metal salt containing calcium. For example, the calcium ionomer can be prepared by mixing an olefin-unsaturated carboxylic acid(-unsaturated carboxylate) copolymer and a metal salt containing calcium in vacuum through a twin-screw extruder at 150 to 250° C. for ½ to 10 minutes. While the calcium ionomer is prepared, titanium dioxide, magnesium stearate, polyethylene wax, blue pigment or the like may also be compounded for simultaneous coloring. This preparation step simplifies the overall process.

According to the invention, the ternary calcium ionomer (a) and the binary calcium ionomer (b) are used in a weight ratio of from 100:0 to 40:60, preferably from 100:0 to 50:50, more preferably from 100:0 to 75:25. Blending more than 60 parts of the binary calcium ionomer (b) per 100 parts by weight of the mixture can adversely affect the feel.

Even when only the ternary calcium ionomer (a) is used as the golf ball material, a high resilience and good feel are obtained. And the outer appearance of the ball is improved and molding defects are minimized because the resin is fully compatible. Additionally, the resin blending step is simplified. The single use is thus a cost effective means.

Use of a mixture of ionomers (a) and (b) is effective for improving the rebound of the golf ball. For the mixture to exert better rebound improving effect, ionomers (a) and (b) are preferably blended in a weight ratio of from 90:10 to 40:60, and especially from 80:20 to 40:60. It is recommended to use a heated mixture of ionomers (a) and (b) which is arrived at by heat mixing ionomers (a) and (b) at 150 to 250° C., and especially 170 to 230° C.

Whether it comprises ionomer (a) alone or a mixture of ionomers (a) and (b), the golf ball material should preferably have a melt index of 0.5 to 15 dg/min, more preferably 1.0 to 12 dg/min, and most preferably 1.5 to 10 dg/min, as measured in accordance with JIS-K6760 at a temperature of 190° C. and under a load of 21 N (2.16 kgf). A melt index outside the range may markedly interfere with processing.

Similarly the golf ball material should have a Shore D hardness of 30 to 60, preferably 35 to 55, and more preferably 40 to 55. A Shore D hardness of more than 60 can detract from the feel. A Shore D hardness of less than 30 may cause the ball to receive more spin when hit with a driver, resulting in short flights.

The golf ball of the invention is produced using the golf ball material according to the invention. The layer or layers made of the golf ball material may constitute part or all of the golf ball. The inventive golf balls may be thread-wound balls, including those in which the cover has a single-layer or a multiple-layer construction, one-piece balls, two-piece solid balls, three-piece solid balls, or multi-piece solid balls having a cover composed of three or more layers.

The inventive golf balls may be manufactured by preparing golf ball materials adequate for making one-piece balls, the solid centers of thread-wound golf balls, the solid cores of solid golf balls, or cover stock (for at least one layer in cores and covers composed of two or more layers) in accordance with the above-described formulation of the invention, then using the material in accordance with a golf ball manufacturing method known to the art.

It is acceptable to incorporate other suitable additives in the golf ball material of the invention, if necessary, prior to use. In the preferred embodiment wherein the material is used as a cover stock, other resin components may be added to the essential calcium ionomer(s) for adjusting the hardness, flow or other factors. Such other resin components include olefin elastomers, polyester elastomers, polyurethane elastomers, styrene elastomers, ionomer resins neutralized with metals other than calcium, ethylene-(meth) acrylic acid copolymers, and ethylene-(meth)acrylic acid-(meth)acrylate copolymers. Of these, olefin elastomers, ionomer resins neutralized with metals other than calcium, ethylene-(meth)acrylic acid copolymers, and ethylene-(meth)acrylic acid-(meth)acrylate copolymers are preferred because they are compatible with the calcium ionomers. When the other resin component is added to the essential calcium ionomer(s), the amount of the other resin is preferably up to 50 parts, more preferably up to 30 parts, and most preferably up to 10 parts by weight per 100 parts by weight of the calcium ionomer(s). More than 50 parts of the other resin can adversely affect the resilience.

The method for preparing the material of the invention is not critical. For instance, when the inventive material is prepared for use as cover stock in the manufacture of golf balls, heating is typically carried out at a temperature of 150 to 250° C. and blending is typically carried out using an internal mixer such as a kneading-type twin-screw extruder, a Banbury mixer or a kneader. Any suitable method may be used without particular limitation to incorporate various additives together with the essential ionomer(s) in the golf ball material of the invention. For example, the additives may be blended with the essential ionomer(s), and heating and mixing of all the ingredients carried out at the same time. Alternatively, the essential ionomer(s) may be pre-heated and pre-mixed, following which the optional additives may be added and the overall composition subjected to additional heating and mixing.

When the cover of a golf ball is made of the golf ball material according to the present invention, the core may be a thread-wound core or a solid core and may be produced by a conventional method. For example, a solid core may be produced by preparing a rubber composition composed of 100 parts by weight of cis-1,4-polybutadiene; from 10 to 60 parts by weight of one or more vulcanizing or crosslinking agents selected from among α,β-monoethylenically unsaturated carboxylic acids (e.g., acrylic acid, methacrylic acid) or metal ion-neutralized compounds thereof and functional monomers (e.g., trimethylolpropane methacrylate); from 5 to 30 parts by weight of a filler such as zinc oxide or barium sulfate; from 0.5 to 5 parts by weight of a peroxide such as dicumyl peroxide; and, if necessary, from 0.1 to 1 part by weight of an antioxidant. The resulting rubber composition can be formed into a solid spherical core by press vulcanization to effect crosslinkage, followed by compression under heating at 140 to 170° C. for a period of 10 to 40 minutes.

The wound core of a thread-wound golf ball may be produced using either a liquid or a solid center. In the case of a liquid center, a hollow spherical center envelope may be formed from the above-described rubber composition, for example, and a liquid filled into this envelope by a well-known method. If a solid center is used instead, the solid center may be produced by the solid core production method described above. Thereafter, rubber thread is wound in a stretched state about the center to form the core.

Use may be made of rubber thread produced by a conventional method. For example, a rubber composition is prepared by compounding natural rubber or synthetic rubber such as polyisoprene with various additives (e.g., antioxidants, vulcanization accelerators and sulfur), extruded and vulcanized.

The golf balls using the various types of cores described above and falling within the scope of the invention can be produced by forming the cover from the inventive golf ball material. In one such method, a single-layer or multi-layer core prefabricated according to the type of ball to be manufactured is placed in a mold, and the inventive material is heated, mixed and melted, then injection-molded over the core. In this case, the golf ball manufacturing operation can be carried out under such conditions that the material maintain excellent thermal stability, flow characteristics and moldability. The resulting golf ball has a high rebound.

In the preferred embodiment wherein the golf ball material of the invention is used as a cover stock, the core should preferably have a hardness or deflection of 2.2 to 5.5 mm, more preferably 2.4 to 4.0 mm, and most preferably 2.6 to 3.5 mm under an applied load of 100 kg. If the core has a 100-kg load deflection of more than 5.5 mm, the golf ball arrived at by enclosing the core with the inventive material may provide a too soft feel when hit. With a 100-kg load deflection of less than 2.2 mm, the resulting ball may provide a too hard feel. Additionally in the preferred embodiment wherein the golf ball material of the invention is used as a cover stock, the resulting ball should preferably have a hardness or deflection of 2.4 to 4.5 mm, more preferably 2.6 to 4.0 mm under an applied load of 100 kg. With a 100-kg load deflection of more than 4.5 mm, the ball may provide a too soft feel. With a 100-kg load deflection of less than 2.4 mm, the ball may provide a too hard feel.

The method used to produce the cover is not limited to the method described above. For example, use may be made of a method in which first a pair of hemispherical cups is molded from the inventive golf ball material, following which the cups are placed over a core and molded under heat (120 to 170° C.) and pressure for 1 to 5 minutes.

Where the golf ball is a multi-piece ball having a multi-layer cover, the inventive material may be used to form the inner or outer layer of the cover. In the two-piece ball event, the inventive material is advantageously used to form the cover. The cover of the two-piece ball or the cover inner or outer layer of the multi-piece ball, which is formed of the inventive material, usually has a gage of 1 to 4 mm, especially 1.3 to 2.3 mm, though not limited thereto.

The surface of the outermost layer of the cover may have a plurality of dimples formed thereon. The cover may be administered various treatment such as surface preparation, stamping and painting. In particular, the ease of work involved in administering such surface treatment to a golf ball cover made of the inventive material can be improved by the good processability of the cover surface.

In the golf balls manufactured as described above, the diameter, weight, hardness and other parameters of the cover, solid or liquid center, solid core or thread-wound core, and one-piece golf balls are not critical and may be adjusted as appropriate, insofar as the objects of the invention are attainable.

In the golf ball of the invention, the inventive golf ball material may be used other than as the cover stock described above. For example, it may be a golf ball arrived at by using the inventive material as a one-piece golf ball material or as a core material, in which case production may be carried out by injection-molding the material.

The golf ball of the invention may be manufactured for use in tournaments by giving it a diameter and weight which conform with the Rules of Golf. That is, the ball may be produced to a diameter of not less than 42.67 mm and a weight of not greater than 45.93 g.

EXAMPLE

Examples of the invention and comparative examples are given below by way of illustration, and are not intended to limit the invention.

Examples 1–3 and Comparative Examples 1–13

Using a core material composed primarily of cis-1,4-polybutadiene, a solid core was produced having a diameter of 38.6 mm, a weight of 35.1 g, and a deflection of 3.1 mm under a load of 100 kg.

Cover materials of the compositions shown in Tables 1 and 2 were mixed at 200° C. with a kneading-type twin-screw extruder and prepared in the form of pellets. In each of the examples, the cover material was injected into a mold in which the solid core had been placed, giving a two-piece solid golf ball having a diameter of 42.8 mm and a cover gage of 2.1 mm.

Example 4 and Comparative Examples 14 and 15

Using a core material composed primarily of cis-1,4-polybutadiene, a solid core was produced having a diameter of 36.8 mm, a weight of 30.4 g, and a deflection of 3.1 mm under a load of 100 kg.

In Example 4, the cover material described above in Example 1 was injection-molded over the core so as to form a cover inner layer having a gage of 1.5 mm. Similarly, in Comparative Examples 14 and 15, the respective cover materials described in Comparative Examples 1 and 3 were injection-molded over the core so as to form in each case a cover inner layer having a gage of 1.5 mm. Next, in each of the three examples, the outer cover material shown in Table 3 was injection-molded over the cover inner layer to a gage of 1.5 mm, thereby giving a three-piece golf ball having a diameter of 42.8 mm.

The following characteristics were measured or evaluated for the golf balls obtained in each of the above examples. The results are shown in Tables 1 to 3.

Melt Index

Measured in accordance with JIS-K6760 at a temperature of 190° C. and under a load of 21 N (2.16 kgf).

Water Quantity

After each cover material was dried at 50° C. for 24 hours, it was held for 24 hours in a thermostat tank set at a temperature of 23° C. and a humidity of 60%. The quantity of water picked up by the sample during the period was measured by a Karl Fischer water instrument.

Injection Moldability

Using each cover material, 200 golf balls were molded by an injection molding machine of the type commonly used in cover formation. A percentage of molding defects including welds and off-centering was determined, based on which injection moldability was evaluated according to the following criterion.

Good: percent molding defective <1%
Poor: 1%≦percent molding defective <3%
VP: percent molding defective ≧3%

Initial Velocity

Measured using the same type of initial velocity instrument as approved by the United States Golf Association (USGA), and in accordance with USGA rules.

Ball Hardness

Measured as the deflection (in millimeters) of the ball under a load of 100 kg.

Feel

Seven players with a head speed of 45 m/s hit the balls with a driver (PRO230 Titan, loft angle 11°, shaft HM50J (HK), Bridgestone Sports Co., Ltd.) and rated in accordance with the following criterion. When players gave different ratings, the rating by the most players was employed.

S: soft
Av: ordinary
H: hard

Trade names mentioned in the tables are described below.

Ternary Calcium Ionomer

It was obtained by heat mixing a (100:1.4) mixture of Nucrel AN4318 (ethylene-methacrylic acid-acrylate ternary copolymer) by Dupont-Mitsui Polychemical K.K. and calcium hydroxide by Kanto Kagaku K.K. (heating temperature 200° C., time 1 minute). Acid content, 8 wt %. Ester content, 17 wt %. Degree of neutralization, 41 mol %.

Binary Calcium Ionomer

It was obtained by heat mixing a (100:2.6) mixture of Nucrel 1560 (ethylene-methacrylic acid binary copolymer) by Dupont-Mitsui Polychemical K.K. and calcium hydroxide by Kanto Kagaku K.K. (heating temperature 200° C., time 1 minute). Acid content, 15 wt %. Degree of neutralization, 40 mol %.

Surlyn 8120

Sodium-neutralized ethylene-methacrylic acid-acrylate ternary copolymer by E.I. DuPont de Nemours and Company. Acid content, 10 wt %. Ester content, 17 wt %.

Surlyn 9320

Zinc-neutralized ethylene-methacrylic acid-acrylate ternary copolymer by E.I. DuPont de Nemours and Company. Acid content, 10 wt %. Ester content, 24 wt %. Degree of neutralization, 50 mol %.

Surlyn 6320

Magnesium-neutralized ethylene-methacrylic acid-acrylate ternary copolymer by E.I. DuPont de Nemours and Company. Acid content, 10 wt %. Ester content, 24 wt %. Degree of neutralization, 50 mol %.

Himilan 1605

Sodium-neutralized ethylene-methacrylic acid binary copolymer by E.I. DuPont de Nemours and Company. Acid content, 15 wt %. Degree of neutralization, 29 mol %.

Himilan 1706

Zinc-neutralized ethylene-methacrylic acid binary copolymer by DuPont-Mitsui Polychemical Co., Ltd. Acid content, 15 wt %. Degree of neutralization, 59 mol %.

Surlyn 7930

Lithium-neutralized ethylene-methacrylic acid binary copolymer by E.I. DuPont de Nemours and Company. Acid content, 15 wt %. Degree of neutralization, 50 mol %.

Himilan AM7311

Magnesium-neutralized ethylene-methacrylic acid binary copolymer by DuPont-Mitsui Polychemical Co., Ltd. Acid content, 15 wt %. Degree of neutralization, 54 mol %.

TABLE 1

|  | Component (pbw) | Example 1 | Example 2 | Example 3 | Comparative Example 1 | Comparative Example 2 | Comparative Example 3 | Comparative Example 4 | Comparative Example 5 |
|---|---|---|---|---|---|---|---|---|---|
| Cover material formulation | Ternary calcium ionomer | 100 | 80 | 50 | — | — | — | — | — |
|  | Binary calcium ionomer | — | 20 | 50 | — | — | — | — | — |
|  | Surlyn 8120 | — | — | — | 100 | — | — | 100 | 80 |
|  | Surlyn 9320 | — | — | — | — | 100 | — | — | — |
|  | Surlyn 6320 | — | — | — | — | — | 100 | — | — |
|  | Himilan 1605 | — | — | — | — | — | — | — | 20 |
|  | Himilan 1706 | — | — | — | — | — | — | — | — |
|  | Surlyn 7930 | — | — | — | — | — | — | — | — |
|  | Himilan AM7311 | — | — | — | — | — | — | — | — |
|  | Calcium stearate | — | — | — | — | — | — | 15 | — |
|  | Titanium dioxide | 2 | 2 | 2 | 2 | 2 | 2 | 2 | 2 |
|  | Polyethylene wax | 1 | 1 | 1 | 1 | 1 | 1 | 1 | 1 |
| Cover physical properties | Cover hardness (Shore D) | 42 | 47 | 54 | 45 | 36 | 44 | 52 | 48 |
|  | Melt index (dg/min) | 2.0 | 2.0 | 2.0 | 0.9 | 1.0 | 1.0 | 1.6 | 1.3 |
|  | Water quantity (ppm) | 955 | 982 | 1011 | 926 | 875 | 3151 | 1691 | 958 |
|  | Injection moldability | Good | Good | Good | Poor | Poor | VP | VP | Good |
| Ball physical properties | Initial velocity (m/s) | 76.6 | 76.9 | 77.3 | 76.4 | 75.8 | 76.6 | 76.9 | 76.7 |
|  | Ball hardness (mm) | 3.35 | 3.15 | 2.84 | 3.23 | 3.61 | 3.27 | 2.92 | 3.09 |
|  | Feel | S | S | S | S | S | S | S | S |

TABLE 2

|  | Component (pbw) | Comparative Example 6 | 7 | 8 | 9 | 10 | 11 | 12 | 13 |
|---|---|---|---|---|---|---|---|---|---|
| Cover material formulation | Ternary calcium ionomer | — | — | — | — | — | — | — | 30 |
|  | Binary calcium ionomer | — | — | — | — | — | — | — | 70 |
|  | Surlyn 8120 | — | — | — | 50 | — | — | — | — |
|  | Surlyn 9320 | 80 | — | — | — | 50 | — | — | — |
|  | Surlyn 6320 | — | 80 | 80 | — | — | 50 | 50 | — |
|  | Himilan 1605 | — | — | — | 50 | — | — | — | — |
|  | Himilan 1706 | 20 | — | — | — | 50 | — | — | — |
|  | Surlyn 7930 | — | 20 | — | — | — | 50 | — | — |
|  | Himilan AM7311 | — | — | 20 | — | — | — | 50 | — |
|  | Calcium stearate | — | — | — | — | — | — | — | — |
|  | Titanium dioxide | 2 | 2 | 2 | 2 | 2 | 2 | 2 | 2 |
|  | Polyethylene wax | 1 | 1 | 1 | 1 | 1 | 1 | 1 | 1 |
| Cover physical properties | Cover hardness (Shore D) | 42 | 48 | 50 | 53 | 51 | 55 | 53 | 59 |
|  | Melt index (dg/min) | 0.9 | 1.3 | 0.9 | 1.9 | 0.9 | 1.7 | 0.9 | 2.0 |
|  | Water quantity (ppm) | 934 | 2878 | 3369 | 995 | 978 | 3260 | 3645 | 1085 |
|  | Injection moldability | Poor | VP | VP | Good | Poor | VP | VP | Good |
| Ball physical properties | Initial velocity (m/s) | 76.4 | 76.7 | 76.9 | 77.0 | 76.9 | 77.2 | 77.1 | 77.4 |
|  | Ball hardness (mm) | 3.35 | 3.08 | 3.00 | 2.88 | 2.97 | 2.80 | 2.88 | 2.63 |
|  | Feel | S | S | S | S | S | H | S | H |

TABLE 3

|  | Component (pbw) | Example 4 | Comparative Example 14 | Comparative Example 15 |
|---|---|---|---|---|
| Cover inner layer | Ternary calcium ionomer | 100 | — | — |
|  | Surlyn 8120 | — | 100 | — |
|  | Surlyn 6320 | — | — | 100 |
|  | Titanium dioxide | 2 | 2 | 2 |
|  | Polyethylene wax | 1 | 1 | 1 |
|  | Gage (mm) | 1.5 | 1.5 | 1.5 |
|  | Injection moldability | Good | VP | VP |
| Cover outer layer | Himilan 1706 | 50 | 50 | 50 |
|  | Himilan 1605 | 50 | 50 | 50 |
|  | Titanium dioxide | 2 | 2 | 2 |
|  | Polyethylene wax | 1 | 1 | 1 |
|  | Gage (mm) | 1.5 | 1.5 | 1.5 |
|  | Cover hardness | 62 | 62 | 62 |
|  | Specific gravity | 0.98 | 0.98 | 0.98 |
| Ball physical properites | Initial velocity (m/s) | 77.3 | 77.1 | 77.3 |
|  | Ball hardness (mm) | 2.85 | 2.73 | 2.77 |
|  | Feel | S | H | H |

Example 1 is a golf ball using a calcium ion-neutralized ionomer of an ethylene-methacrylic acid-acrylate ternary copolymer as the cover stock and falling within the scope of the invention. As compared with Comparative Examples 1 to 3 using sodium, zinc and magnesium ion-neutralized ionomers of ethylene-methacrylic acid-acrylate ternary copolymers as the cover stock, respectively, Example 1 exhibited a high rebound (because the ball of Example 1 was softer despite an equal initial velocity to Comparative Example 3) and good moldability.

Example 2 is a golf ball using a blend of a calcium ion-neutralized ionomer of an ethylene-methacrylic acid-acrylate ternary copolymer and a calcium ion-neutralized ionomer of an ethylene-methacrylic acid binary copolymer as the cover stock and falling within the scope of the invention. As compared with Comparative Examples 5 to 8 using blends of binary and ternary ionomers having a similar hardness as the cover stock, Example 2 exhibited a high rebound and good moldability.

Example 3 is a golf ball using a blend of a calcium ion-neutralized ionomer of an ethylene-methacrylic acid-acrylate ternary copolymer and a calcium ion-neutralized ionomer of an ethylene-methacrylic acid binary copolymer as the cover stock and falling within the scope of the invention. As compared with Comparative Examples 9 to 12 using blends of binary and ternary ionomers having a similar hardness as the cover stock and Comparative Example 4 using a metal soap-modified ionomer having a similar hardness as the cover stock, Example 3 exhibited a high rebound and good moldability.

Example 4 is a golf ball using a calcium ion-neutralized ionomer of an ethylene-methacrylic acid-acrylate ternary copolymer as the intermediate layer material and falling within the scope of the invention. As compared with Comparative Examples 14 and 15 using sodium and magnesium ion-neutralized ionomers of ethylene-methacrylic acid-acrylate ternary copolymers, respectively, Example 4 exhibited a high rebound (because the ball of Example 4 was softer despite an equal initial velocity to Comparative Example 15) and good moldability.

There has been described a golf ball material which is effectively moldable and is capable of providing golf balls with excellent rebound energy and a pleasant feel when hit.

Japanese Patent Application No. 11-366921 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A three-piece golf ball consisting of a core and a cover inner layer and a cover outer layer, wherein the cover inner layer is formed of a material comprising (a) a ternary calcium ionomer in the form of a calcium ion-neutralized product of an olefin-unsaturated carboxylic acid-unsaturated carboxylate random copolymer, wherein the ternary calcium ionomer (a) has an ester content of 5 to 45% by weight and the acid content of 4 to 12% by weight, a degree of neutralization of 10 to 90 mol %, and a Shore D hardness of 30 to 60.

2. The three piece golf ball of claim 1 wherein component (a) has a melt index of 0.5 to 15 dg/min.

3. The three piece golf ball of claim 1 wherein the ternary calcium ionomer (a) has a degree of neutralization of 10 to 70 mol %.

4. The three piece golf ball of claim 1 wherein the ternary calcium ionomer (a) has a degree of neutralization of 10 to 60 mol %.

5. The three piece golf ball of claim 1 wherein the ternary calcium ionomer (a) has an ester content of 8 to 30% by weight.

6. The three niece golf ball of claim 1 wherein the ternary calcium ionomer (a) has an ester content of is 10 to 20% by weight.

7. The three piece golf ball of claim 1 wherein the acid content within the ternary calcium ionomer (a) is 4 to 10% by weight.

8. The three piece golf ball of claim 1 wherein the acid content within the ternary calcium ionomer (a) is 6 to 8% by weight.

9. The three-piece golf ball of claim 1 wherein the gage of the cover inner layer is 1.3 to 2.3 mm.

10. The three-piece golf ball of claim 1 wherein the material for the cover inner layer has a Shore D hardness of 35 to 55.

11. The three-piece golf ball of claim 1 wherein the material for the cover inner layer has a Shore D hardness of 40 to 55.

* * * * *